(12) United States Patent
Yap

(10) Patent No.: US 8,244,077 B1
(45) Date of Patent: Aug. 14, 2012

(54) UNIT-CELL ARRAY OPTICAL SIGNAL PROCESSOR

(75) Inventor: Daniel Yap, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 13/114,594

(22) Filed: May 24, 2011

Related U.S. Application Data

(62) Division of application No. 12/131,088, filed on Jun. 1, 2008, now Pat. No. 8,019,185.

(51) Int. Cl.
*G02F 1/035* (2006.01)
*G02F 1/01* (2006.01)
*G02F 1/295* (2006.01)
*G02B 6/26* (2006.01)
*G02B 6/42* (2006.01)

(52) U.S. Cl. ............. 385/3; 385/1; 385/2; 385/4; 385/8; 385/9; 385/31; 385/32; 385/39; 385/40; 385/41

(58) Field of Classification Search .................. 385/3, 8, 385/9
See application file for complete search history.

(56) References Cited

U.S. PATENT DOCUMENTS

| | | | | |
|---|---|---|---|---|
| 6,668,006 | B1 * | 12/2003 | Margalit et al. | 372/97 |
| 2005/0286602 | A1 | 12/2005 | Gunn et al. | |
| 2006/0215949 | A1 * | 9/2006 | Lipson et al. | 385/2 |
| 2007/0009205 | A1 | 1/2007 | Maleki et al. | |
| 2009/0208209 | A1 | 8/2009 | Ng et al. | |

OTHER PUBLICATIONS

U.S. Appl. No. 12/560,409 to Ng, pending, unpublished (filed Sep. 15, 2009), commonly assigned with present patent application.
U.S. Appl. No. 12/763,965 to Ng et al., pending, unpublished (filed Apr. 20, 2010), commonly assigned with present patent application.

* cited by examiner

*Primary Examiner* — Ryan Lepisto
(74) *Attorney, Agent, or Firm* — OConnor & Company

(57) ABSTRACT

This invention provides a versatile unit cell as well as programmable and reconfigurable optical signal processors (such as optical-domain RF filters) that are constructed from arrays of those unit cells interconnected by optical waveguides. Each unit cell comprises an optical microdisk, an optical phase shifter, and at least one input/output optical waveguide, wherein the microdisk and the phase shifter are both optically connected to a common waveguide.

20 Claims, 11 Drawing Sheets

UNIT-CELL ARRAY OPTICAL SIGNAL PROCESSOR

RELATED APPLICATIONS

This patent application is a divisional application under 35 U.S.C. §121 of U.S. patent application Ser. No. 12/131,088, filed Jun. 1, 2008, which is incorporated by reference herein in its entirety.

Some embodiments of the present invention relate to embodiments and features described in U.S. Patent App. No. 61/028,625 (Ng et al.), filed Feb. 14, 2008, the disclosure of which is hereby incorporated by reference in its entirety, and which assignee is the same as the assignee of this patent.

FIELD OF THE INVENTION

The present invention generally relates to communication and signal-processing systems, and relates more specifically to methods and devices for optical signal processing.

BACKGROUND OF THE INVENTION

The ever-increasing demand for broadband communication systems has led to optical-transmission systems based on optical waveguides such as optical fibers and on optical processing elements for use in these systems. Generally, in high-performance communication systems, photons continue to supplant electrons as messengers.

Significant effort has been spent towards optical integrated circuits having high complexity and advanced functionality. As is described in Driessen et al., *Proc. of SPIE* Vol. 5956, 2005, which is hereby incorporated by reference herein, optical microresonators can be considered as promising building blocks for filtering, amplification, switching, and sensing. Active functions can be obtained by monolithic integration or by a hybrid approach using materials with thermo-optic, electro-optic, and optoelectronic properties and materials with optical gain.

In a common configuration in microresonator-based sensors, a microresonator is placed in close proximity to an optical waveguide such as an optical fiber whose geometry has been specifically tailored—for example, tapered or etched to a size of 1-5 microns. The tapering modifications to the waveguide result in there being a substantial optical field outside the waveguide, so that light can couple into the microresonator and excite its eigenmodes. These eigenmodes may be of various types, depending upon the resonant cavity geometry.

Optical microdisks or microring waveguides have been used in the past as both resonators and switches. Djordjev et al. describe a microdisk that can work as a tunable filter as well as a path switch for light of a particular wavelength (*IEEE Photonics Technology Letters*, vol. 14, no. 6, June 2002, pp. 828-830). The switching occurs when the resonance frequency of the microdisk resonator matches the frequency of the light in an input waveguide, thereby coupling light from that waveguide through the resonator into an output waveguide. When the resonance frequency is tuned to be different than the frequency of the waveguided light, that light is not coupled into the resonator but rather remains in the input waveguide. This switching behavior occurs for light whose wavelength or frequency is within a very narrow range of values.

An optical ring resonator whose switching behavior is controlled solely by controlling the coupling that occurs at its two resonator-to-waveguide coupling regions is described by Yariv (*Electronics Letters*, vol. 36, no. 4, February 2000, pp. 321-322). According to Yariv, the amount of light that remains in a first waveguide or that is coupled via the resonator into a second waveguide is controlled by adjusting the coupling coefficients of the two coupling regions—between first waveguide and resonator, and between second waveguide and resonator.

When the resonator is operated near its "critical coupling" point, the attenuation of the light in the resonator after a round trip is approximately equal to the amount of light coupled at the coupling region. At this critical coupling point, there can be perfect destructive (phase) interference at the output waveguide segment of a first waveguide between the light transmitted from the input waveguide segment of that first waveguide and the light coupled from the resonator into that output waveguide segment. When this perfect destructive interference occurs, all of the light is coupled into the resonator. That light, coupled into the resonator from the first waveguide, can be coupled almost completely out of the resonator through a second waveguide.

One type of filter known in the art is a cascade of 2×2 (two inputs and two outputs) finite impulse response (FIR) filtering stages such as described by K. Takiguchi et al., *Journal of Lightwave Technology*, vol. 13, no. 1, January 1995, pp. 73-82. Each FIR stage contains an optical waveguide 2×2 coupler that divides the light into a pair of waveguide paths and then another optical waveguide 2×2 coupler that combines the light from those two paths. Thus, each FIR stage can resemble a Mach-Zehnder interferometer, having, in general, two arms of unequal lengths.

Another type of filter is a cascade of 2×2 infinite impulse response (IIR) filtering stages such as described by K. Jinguji, *Journal of Lightwave Technology*, vol. 14, no. 8, August 1996, pp. 1882-1898. This filtering stage is similar to the FIR stage but has an optical ring resonator coupled to one of the waveguide arms. There can be an optical phase shifter in the other waveguide arm.

Examples of delay-line filter designs that contain both ring resonators and phase shifters are described by K. Jinguji and M. Oguma, *Journal of Lightwave Technology*, vol. 18, no. 2, February 2000, pp. 252-259 and by C. Madsen, Journal of *Lightwave Technology*, vol. 18, no. 6, June 2000, pp. 860-868. Both the optical ring resonator and the optical phase shifter can be located in the same arm of a Mach-Zehnder interferometer.

Optoelectronic devices that are based on a combination of dielectric optical waveguides (such as silica waveguides) and thin portions of semiconductor optoelectronic materials (such as InP or GaAs) are described in U.S. Pat. No. 6,852,566 (D. Yap) and U.S. Pat. No. 6,875,985 (D. Yap), both of which are hereby incorporated by reference herein. Devices described by these patents comprise at least one dielectric optical waveguide and a layer of "active" semiconductor material physically bonded to the dielectric waveguide material, wherein the "active" semiconductor material is able to generate light; detect light; amplify light; or modulate the intensity, phase, or polarization of the light.

In practice, both for convenience and for economic reasons, it would be beneficial if a simple unit cell could be suitable for the construction of filter building blocks comprising combinations of multiple unit cells. A preferred elemental unit cell would be versatile and could be used to construct the types of filters described by Jinguji et al. and Madsen, cited above, and other signal processors of various complexities and functionalities.

In view of the state in the art, there is a need for the aforementioned simple unit cell, along with methods to make and use such a unit cell in a signal processor or filter. Further, there is a need in the art for a programmable optical microdisk capable of operating as a switch, as a coupler, and as a resonator element in a delay-line filter. Finally, there is a need to integrate an optical microdisk with an optical phase shifter both coupled to the same optical waveguide.

SUMMARY OF THE INVENTION

The present invention addresses the aforementioned needs in the art, as will now be summarized and further described in detail below.

In a first aspect of the present invention, a unit cell is provided which comprises an optical microdisk, an optical phase shifter, and at least two input/output optical waveguides, wherein the microdisk and the phase shifter are both optically connected to a first input/output optical waveguide, and wherein the microdisk is optically connected to a second input/output optical waveguide.

In some embodiments of the unit cell, the optical microdisk and optical phase shifter are separately programmable. The optical microdisk can comprise two programmable coupling regions and a programmable resonance frequency or phase shift.

In certain preferred embodiments, the unit cell comprises a thin layer of semiconductor material in optical connection with an input/output optical waveguide (preferably at least two input/output optical waveguides). The layer of semiconductor material preferably includes an undoped region and a doped region, preferably configured substantially laterally. In some embodiments, the input/output optical waveguide(s) includes a core region, wherein the undoped region is located vertically above the core region and the doped region is not adjacent to the core region.

The combination of the undoped region and the doped region can form a lateral P-i-N diode. In some embodiments, application of a voltage to the P-i-N diode is capable of producing an effective change in the optical refractive index of the undoped region in the P-i-N diode. In some embodiments, application of a current to the P-i-N diode is capable of producing an effective change in the optical refractive index of the undoped region in the P-i-N diode.

In some embodiments, the combination of the undoped region and the doped region forms a lateral N-i-N device. Application of a voltage to the lateral N-i-N device is preferably capable of producing an electrical current suitable to change the optical refractive index of the undoped region in the lateral N-i-N device.

In some variations of the invention, the unit cell further comprises two or more input optical ports and two or more output optical ports for optically connecting to other unit cells, wherein a first pair of input and output optical ports comprise terminations of the first input/output optical waveguide, and wherein a second pair of input and output optical ports comprise terminations of the second input/output optical waveguide.

In some variations of the invention, the unit cell comprises two or more input optical ports and two or more output optical ports for optically connecting to other unit cells. In certain embodiments, the unit cell includes exactly two input optical ports and two output optical ports for optically connecting to other unit cells. The unit cell can include three ports optically connected to the microdisk, with a fourth port optically connected to a phase shifter.

In some embodiments, the microdisk can include an optional resistive heating element. The microdisk can also include one or more coupling regions and one or more phase-shifting sections. In certain embodiments, the unit cell comprises two coupling regions and two phase shifters on the microdisk, and further includes a separate phase shifter.

Another aspect of the present invention described herein provides an optical signal processor comprising a plurality of unit cells. These unit cells are preferably as described herein above and in the detailed description.

In some embodiments, the optical signal processor is an optical filter comprising a plurality of unit cells, wherein each unit cell includes an optical microdisk, an optical phase shifter, and a first input/output optical waveguide, and a second input/output optical waveguide, wherein the microdisk and the phase shifter are both optically connected to the first input/output optical waveguide (i.e., the microdisk and phase shifter are connected to the same waveguide), and wherein the second input/output optical waveguide is optically connected to the microdisk.

In certain preferred embodiments of this optical filter, each unit cell comprises a thin layer of semiconductor material, in optical connection with an input/output optical waveguide, at least one undoped region, and at least one doped region.

An optical filter can be a programmable delay-line filter constructed by interconnecting, with optical waveguides, an arrayed plurality of the unit cells. This interconnection can be two-dimensional in nature. In certain embodiments, all of the unit cells are substantially identical in composition. In other embodiments, different unit cells have different composition.

In various optical filters provided herein, some or all of the unit cells can be used as 2×2 optical couplers, 2×1 optical combiners, 1×2 optical power splitters, recursive delay lines, optical path switches, optical phase shifters, or some combination of these functions.

Another aspect of the invention provides a programmable signal-processing building block comprising a combination of four unit cells each as described herein above, wherein the building block has up to four optical inputs and up to four optical outputs. This programmable signal-processing building block can be programmed in a manner suitable for a function selected from the group consisting of finite impulse response filter, infinite impulse response filter, delay line with adjustable phase shift, optical power splitter, optical power coupler, optical switch, and recursive optical delay line.

Yet another aspect of the present invention relates to methods of constructing an optical signal processor comprising a plurality of unit cells. In certain embodiments, these methods comprise the common steps in various order:

(i) providing (e.g., fabricating) a plurality of unit cells, wherein each unit cell includes an optical microdisk including a circular path, an optical phase shifter, a first input/output optical waveguide, and a second input/output optical waveguide, wherein the microdisk and the phase shifter are optically connected by means of the first input/output optical waveguide, and wherein the second input/output optical waveguide is optically connected to the microdisk; and (ii) interconnecting at least some of the plurality of unit cells with a plurality of optical waveguides, the plurality of optical waveguides being connected to the unit cells by means of the first and second input/output optical waveguides in the unit cells.

In some embodiments of these methods, a further step is provided, comprising providing a thin layer of semiconductor material, having an undoped region and a doped region, in optical connection with the input/output optical waveguide, in substantially each unit cell.

In some embodiments, methods further comprise programming at least some of the unit cells to function as 2×2 optical couplers each comprising two inputs and two outputs, wherein the optical microdisk of the unit cells includes two coupling regions, the two coupling regions suitably programmed to establish the relative amount of power coupled between each of the first and second input/output waveguides and the circular path.

In some embodiments, methods further comprise programming at least some of the unit cells to function as 2×1 optical power combiners, wherein the optical microdisk of each of the unit cells includes first and second coupling regions, the first coupling region suitably programmed to partially couple light from the first input/output optical waveguide into the circular path of the microdisk, and the second coupling region suitably programmed to fully couple light from the circular path to the second input/output optical waveguide.

In other embodiments, methods further comprise programming at least some of the unit cells to function as optical path switches, wherein the optical microdisk of the unit cells includes two coupling regions, the two coupling regions both suitably programmed to either (a) fully couple light between the first and second input/output optical waveguide and the circular path of the microdisk or to (b) not couple light between the first and second input/output optical waveguide and the circular path of the microdisk.

In various embodiments that provide a thin layer of semiconductor material having an undoped region and a doped region in optical connection with at least one input/output optical waveguide, programming can be implemented by appropriately electrically energizing the undoped and doped regions of the semiconductor material.

Still another aspect of the invention provides for methods of using the unit cells and optical signal processors described herein. In some variations, methods for optical signal processing comprise:

(i) providing at least one input optical signal;
(ii) providing a plurality of unit cells, wherein each unit cell includes an optical microdisk, an optical phase shifter, at least one input/output optical waveguide, the optical microdisk and optical phase shifter each comprising a thin layer of semiconductor material, each further comprising at least one undoped region and at least one doped region in optical connection with the at least one input/output optical waveguide;
(iii) optionally programming the plurality of unit cells, comprising applying suitable voltages to electrical contacts of the microdisk and the phase shifter;
(iv) directing the at least one input optical signal to the plurality of unit cells; and
(v) using at least one output optical signal.

Certain methods of use comprise using at least some of the unit cells in a manner suitable for a function selected from the group consisting of 2×2 optical coupler, 2×1 optical combiner, 1×2 optical power splitter, recursive delay line, optical path switch, and optical phase shifter.

Some methods of use comprise one or more signal-processing functions selected from the group consisting of finite impulse response filter, infinite impulse response filter, delay line with adjustable phase shift, optical power splitter, optical power coupler, optical switch, and recursive optical delay line.

Some methods of use can propagate information in an optical-telecommunications network. Certain methods of use equalize information in a wavelength-multiplexed network or allow for selection of wavelength channels. Other methods of use allow for preprocessing of RF-modulated optical signals before conversion back to the RF domain.

These and other aspects, variations, and embodiments of the present invention will become apparent by reference to the detailed description below.

DETAILED DESCRIPTION OF EMBODIMENTS OF THE INVENTION

The apparatus and methods of the present invention will now be described in detail by reference to various non-limiting embodiments of the invention.

Unless otherwise indicated, all numbers expressing dimensions, frequencies, parameters, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

The disclosure herein describes, inter alia, an elemental unit cell from which to construct filter building blocks. As will be appreciated by a skilled artisan, the unit cell of the present invention can be a versatile component that is capable of performing the different functions of the various separate components contained in filter building blocks. In various embodiments, the unit cell provided by the present invention can operate as an optical phase modulator, an optical resonator, or as a series combination of phase shifter and optical resonator.

Some embodiments of the present invention are premised on the realization, at least in part, that a programmable phase shifter can be implemented to have no net phase delay—as if the phase shifter were absent. Some embodiments of the present invention are also premised on the recognition, at least in part, that a programmable microdisk can be programmed in a manner such that no light is coupled into that microdisk from its input waveguide—as if the microdisk were not present. Furthermore, some embodiments of the present invention make use of the realization that a programmable microdisk having a pair of input and output waveguides cascaded with a programmable optical phase shifter can perform at least some of the functions of a cascade of two programmable 2×2 optical direction couplers.

Certain preferred embodiments of the present invention will now be described in more detail, by reference to the accompanying figures. The figures are understood to provide representative illustration of the invention and are not limiting in their content. Figures are not necessarily drawn to scale. It will be understood by one of ordinary skill in the art that the scope of the invention extends beyond the specific embodiments depicted.

Figure 1:
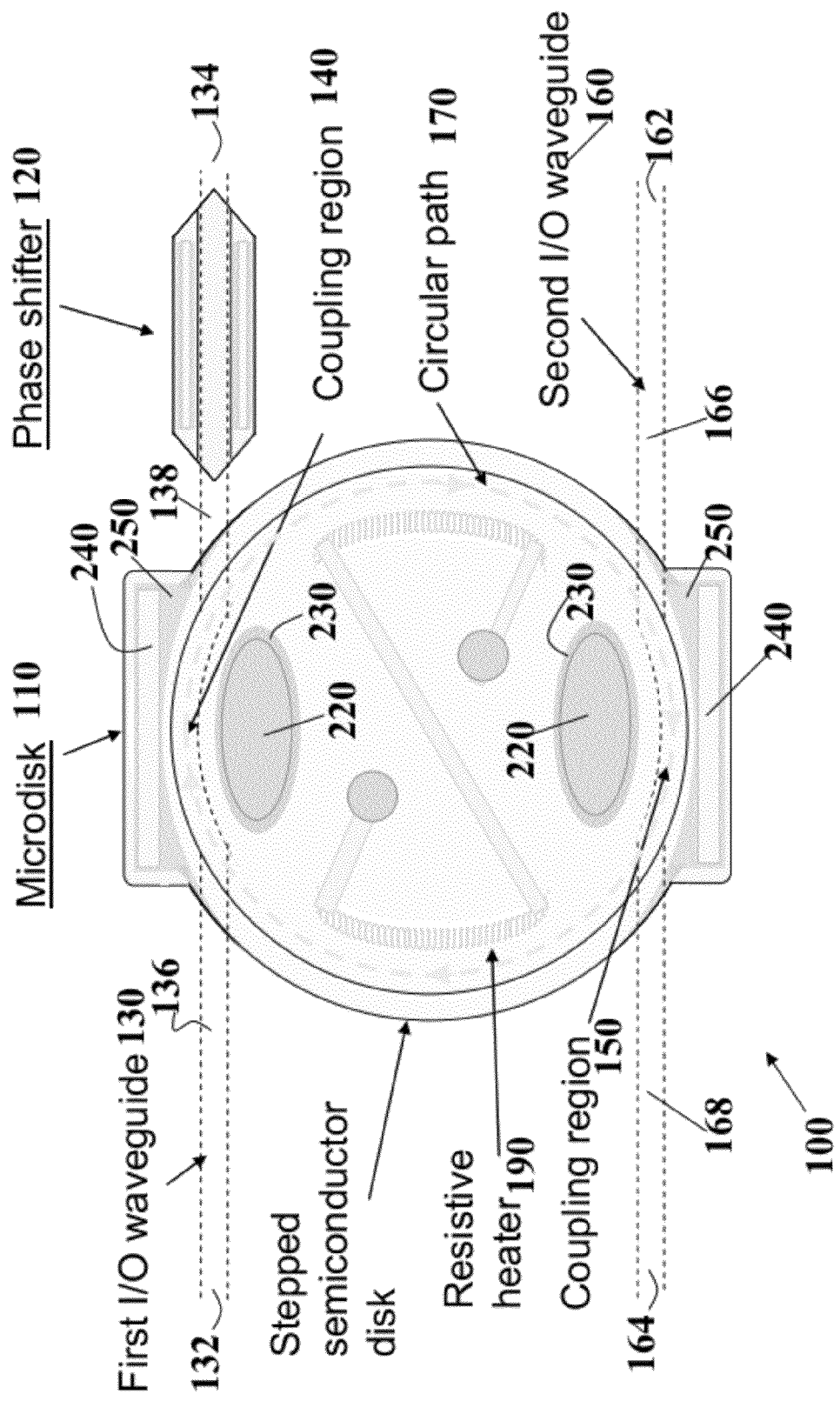
FIG. 1 is an illustration of an embodiment of the unit cell of the invention.

Reference can first be made to FIG. 1, which is a schematic of a unit cell of the invention in some embodiments. The unit cell 100 according to FIG. 1 comprises a programmable microdisk 110, a programmable phase shifter 120, and optical waveguides 130 and 160 (which can also be described as sections of optical waveguides). The unit cell of FIG. 1 contains four input/output (I/O) ports 132, 134, 162, and 164, with typically two of these optical ports acting as inputs and two of these optical ports acting as outputs. An input optical port and output optical port together are terminations of an input/output optical waveguides. For example, input port 132 and output port 134 are terminations of optical waveguide 136.

The microdisk 110 has a circular path 170 through which light propagates. When the light makes multiple round trips around the circular path, the microdisk is an optical ring resonator. The microdisk has a pair of I/O waveguides (which can be considered a first waveguide 130 and a second waveguide 160). The microdisk also has at least two optical-coupling regions 140, 150 at which light can be coupled between the I/O waveguides 130, 160 and the circular path 170. Thus, light in the microdisk travels in its circular path until that light is absorbed (or lost to scattering) or that light is coupled out from the microdisk to an I/O waveguide by means of these coupling regions. Also, light propagating in an I/O waveguide can be coupled into the circular path by means of these coupling regions. The operation of a coupling region is similar to that of an optical-waveguide directional coupler.

The amount of light that is coupled at a coupling region can be controlled electrically. A coupling region 140, 150 is illustrated in more detail in FIG. 2. Each coupling region 140, 150 contains some semiconductor material whose optical refractive index can be controlled electrically and some means to change that optical refractive index. For example, the semiconductor material can be made of InP or GaAs, which are merely exemplary materials. The semiconductor material in the optical-coupling region 210 of coupling region 140, 150 preferably is undoped.

As used in the present disclosure, an "undoped" semiconductor is a pure semiconductor without any significant dopant species present. An undoped semiconductor can also be referred to as an "intrinsic" or "i-type" semiconductor. For present purposes, an unintentionally doped semiconductor shall also fall within the meaning of an undoped semiconductor, notwithstanding the possible imbalance between the number of electrons and the number of holes due to the presence of an unintentional dopant which may be, for example, an impurity or an erroneously added species.

Figure 2:
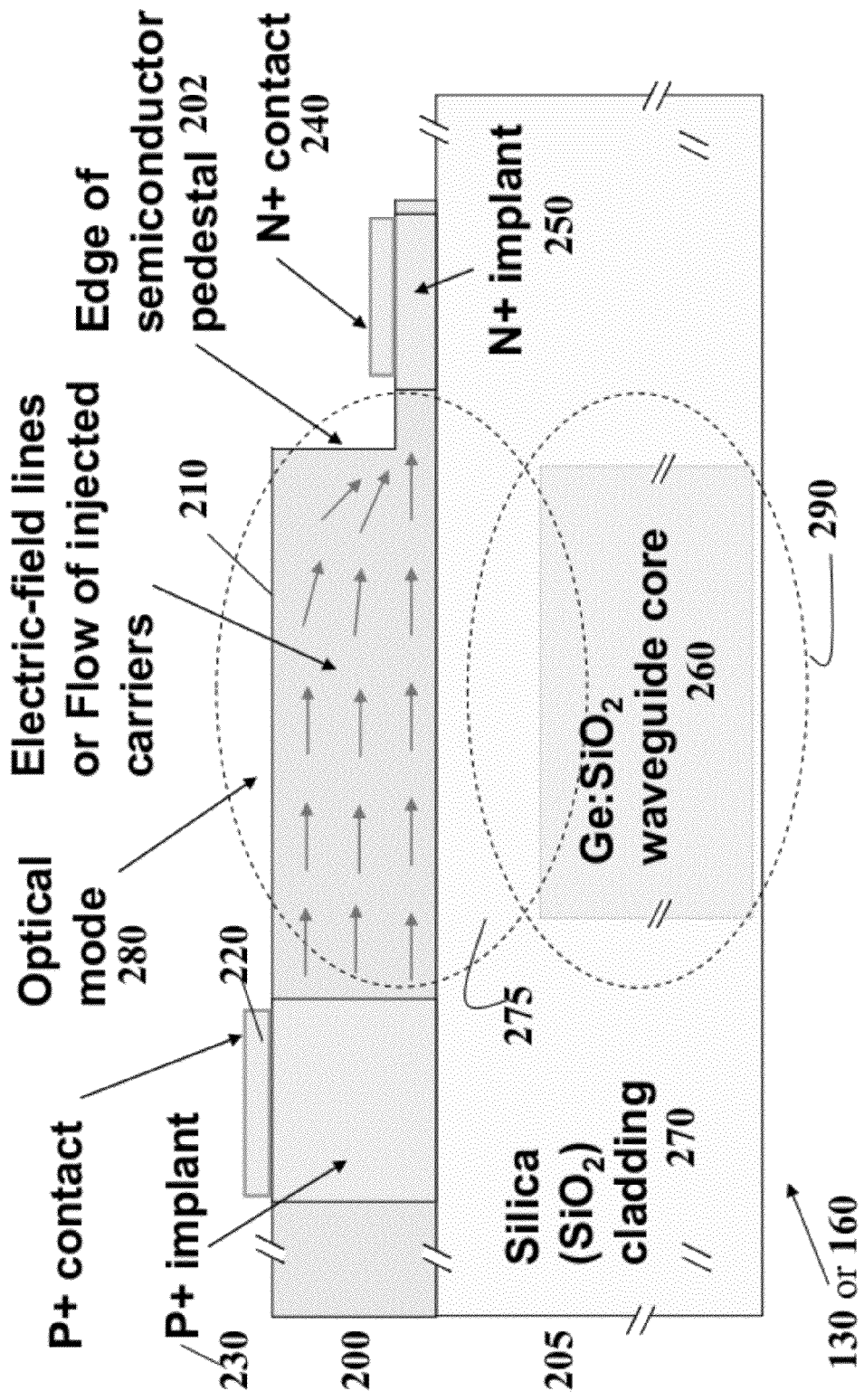
FIG. 2 is a cross-sectional illustration of the coupling region of a microdisk according to some embodiments.

The microdisk of FIG. 1 and FIG. 2 also contains a pair of metal electrodes 220, 240 and a pair of doped semiconductor regions 230, 250 near each optical-coupling region 210. An electrical voltage applied across a pair of electrodes 220, 240 or an electrical current applied through those electrodes can affect the optical refractive index of the semiconductor material in the optical coupling region 210. An applied voltage changes the optical refractive index by means of the electro-optic property or the electro-refractive property of the semiconductor material. An applied current, which injects electrical charge carriers through the semiconductor material of the coupling region, changes the optical refractive index by means of the free-carrier (or plasma) effect.

The light in a microdisk that operates as a resonator can make many round trips through the circular path 170. The number of round trips that light makes before the light is attenuated is described by a property called the "intrinsic Q" of the resonator. In general, it is preferable to minimize the attenuation of the light traveling in a resonator (maximize the intrinsic Q). The number of round trips that light makes before the light is coupled out through a coupling region is described by a parameter called the "extrinsic Q" or "loaded Q" of the resonator. The resonator together with its input/output waveguide acts like a recursive delay line, with the effective delay being related to the number of round trips the light coupled into a resonator makes within that resonator before that light is coupled out again. The amount of coupling that occurs in a coupling region (described by the coupling coefficient of that coupling region) provides a means to adjust or program properties of the unit cell.

Light can be coupled into a microdisk (such as the microdisk shown in FIG. 1) through either one of its two I/O waveguides 130, 160. Likewise, light can be coupled out from a microdisk through either one of its two I/O waveguides 130, 160. Thus, a microdisk and its pair of I/O waveguides acts like a 2×2 optical delay device. The two portions of the I/O waveguide pair that can provide light into the microdisk can be considered the input waveguide segments (e.g. 136, 166). Also, the two portions of the I/O waveguide pair that can extract light from the microdisk can be considered the output waveguide segments (e.g. 138, 168). The ends of these four segments thus constitute four optical ports of a microdisk device: two input ports (e.g. 132, 162) and two output ports (e.g. 134, 164).

It is noted that the roles of the input and output ports and the input and output waveguide segments can be reversed, depending on the direction in which the light travels through the circular path. For example, the numerical designations provided herein for the various ports and waveguide segments are consistent with light traveling in a clockwise direction around the circular path.

The time that it takes for the light to make a round trip through the circular path of a microdisk is associated with a resonance frequency of that microdisk. That resonance frequency is equal to the inverse of the round trip time. The resonance frequency of a microdisk can be adjusted electrically.

One method to adjust the resonance frequency is to heat the semiconductor material, since the optical refractive index of the material is affected by its temperature. The embodiment shown in FIG. 1 includes a resistive heater 190 comprising a pattern of thin metal strips for heating the semiconductor material. The resistive heater may primarily heat only some portions of the circular path 170. A microdisk can have its resonance frequency programmed and also the coupling coefficients at its two coupling regions 140, 150 programmed. This characteristic allows the microdisk to function as an optical switch or as a switched optical delay element.

A preferred unit cell also contains a separate optical phase shifter 120. That phase shifter 120 can be a dielectric optical waveguide that includes some semiconductor material such as InP or GaAs. The optical refractive index of this semiconductor material can be changed by means of an applied voltage (which establishes an electric field in that material) or by means of an applied current (which injects electrical charge carriers through the material). A change in the refractive index of the semiconductor material results in a change in the optical phase of the light that has propagated through the optical phase shifter. The phase shifter is preferably optically connected to one of the input/output waveguides (e.g., 130) of the microdisk 110. Thus, the optical phase of the light coupled to or from the microdisk can be programmed by the electrical voltage or current applied to the phase shifter. The semiconductor material of the phase shifter preferably, but not necessarily, is the same as the material of the microdisk.

Figure 3:
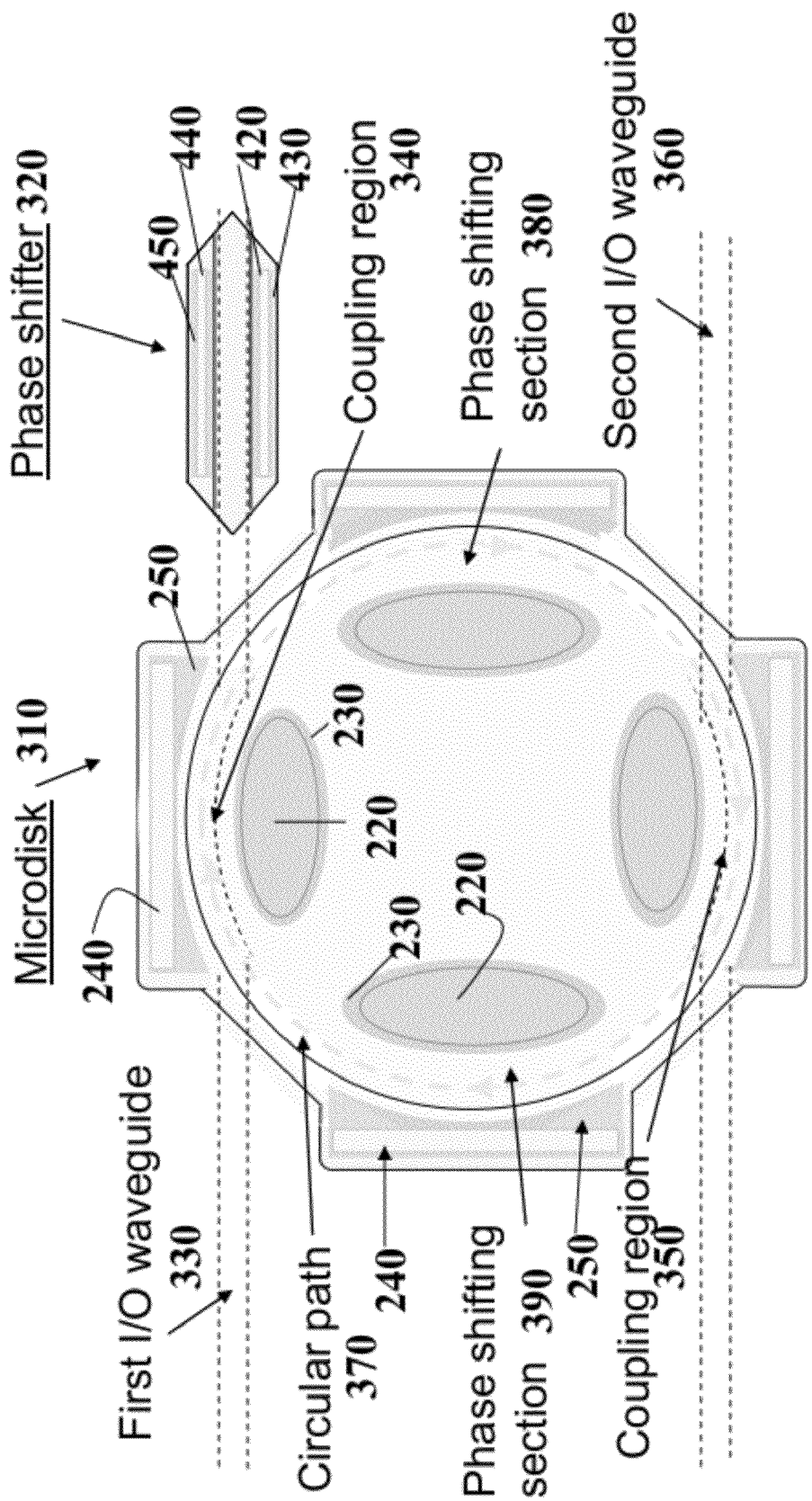
FIG. 3 is a depiction of a second embodiment of the unit cell of the invention.

FIG. 3 depicts another embodiment of the unit cell of this invention. The unit cell of this embodiment, like the unit cell of the first embodiment described above in FIG. 1, comprises a programmable microdisk 310, at least one programmable phase shifter 320, and sections of optical waveguide 330, 360. The programmable phase shifter 320 of FIG. 3 is identical to the programmable phase shifter 120 of FIG. 1, in these embodiments. The programmable microdisk of FIG. 3 is similar to the programmable microdisk of FIG. 1.

The microdisk of FIG. 3 has at least one phase-shifting section 380, 390 in addition to the two coupling sections 340, 350. The optical refractive index of the semiconductor material in these phase-shifting sections can be changed by applying an electrical voltage or current to the sections. Each phase-shifting section 380, 390 of the resonator is similar to the coupling regions 340, 350. Apart from the waveguide core 260, which is absent from a phase-shifting section, FIG. 2 also can illustrate the parts of a phase-shifting section 380, 390. A phase-shifting section preferably contains a pair of metal electrodes 220, 240 and a pair of doped semiconductor regions 230, 250 near the portion of the circular path passing through that section. Although the phase-shifting section occupies only a portion of the overall circular path, it is the overall round-trip time of the light that determines the resonance frequency of the microdisk. Thus, the resonance frequency can be changed by means of the electrical voltage or current applied to the phase shifting sections.

FIG. 2 shows the cross-section of a microdisk provided by the present invention. This cross section is taken through one of the two optical coupling sections 140, 160, 340, 360 of the microdisk or through a phase-shifting section 380, 390. The microdisk is essentially a thin piece of semiconductor material 200 that lies above a dielectric substrate 205 in which an optical waveguide is formed. The dielectric substrate 205 can comprise materials such as silicon dioxide or silicon nitride. The optical waveguide has a core region 260 of a material that has a higher optical refractive index than the index of the remaining dielectric material, which constitutes the waveguide cladding 270.

For example, the core region 260 can be made of a material such as germanium-doped silicon dioxide. Typical dimensions of the core region are 2-8 μm in the vertical direction and 2-8 μm in the lateral direction, although other dimensions are certainly possible. A waveguide-core of Ge-doped silica, surrounded by silica cladding, is preferred because it is known to be characterized by a low waveguide loss (per length basis). The level of Ge doping can be about 0.5-3%, such as that employed in commercial devices, or some other level of Ge doping. Other dielectric waveguides can be used, including for example silicon nitride ($Si_xN_y$) or silicon oxynitride (SiON), among other possibilities as will be appreciated.

A waveguided optical mode 290 can be carried in the waveguide. That optical mode 290 overlaps the core region 260 and can extend somewhat beyond the core region into the surrounding dielectric material, as shown in FIG. 2. The core region 260 is separated from the semiconductor material 200 by a region of the substrate material, or some other material having lower refractive index than the core region. The thickness of this separation region 275 is typically between 0.5-6 μm.

The semiconductor layer 200 is preferably thin, in comparison, and can have a stepped profile. The portion of the semiconductor layer that is directly above the waveguide core region is thicker, typically having a thickness of about 0.1-0.3 μm. The portion of the semiconductor layer that is further toward the center of the microdisk can have that same thickness, about 0.1-0.3 μm, in some embodiments. The portion of the semiconductor layer that is further toward the edge of the microdisk can be thinner, such as less than 0.1 μm.

The semiconductor material 200, such as InP or GaAs, has an optical refractive index that is higher than the refractive index of the dielectric material of the substrate 205. For example, the refractive index of the semiconductor material can be greater than 1.5, preferably greater than 2.0, and more preferably greater than 3.0 when $SiO_2$ is employed as the dielectric substrate material (the refractive index of $SiO_2$ is about 1.46). Typically, the semiconductor material is exposed to the air (or vacuum), which has a refractive index of approximately 1.0 (exactly unity for perfect vacuum).

In some embodiments, the step 202 in the semiconductor layer 200 results in a large change in the effective refractive index experienced by the light. This refractive index step between the central portion of the microdisk structure and the edge portion of that structure can be effective for supporting a whispering gallery optical mode (a traveling wave confined close to the surface) that propagates around the microdisk structure in a circular path. When the semiconductor layer is thin, as is preferable, much of the whispering gallery optical mode 280 does not overlap the optically lossy semiconductor material but rather extends outside it, into the dielectric material or into the air, as illustrated in the FIG. 2.

The portion of the semiconductor layer 200 that overlaps with the whispering gallery optical mode 280 preferably consists of undoped material, thereby reducing the concentration of free electrical carriers in that material. Free carriers result in absorption of the light, so undoped material has lower optical attenuation. The other portions of the semiconductor layer, both toward the center of the microdisk structure and toward the perimeter of the microdisk structure, preferably comprise doped semiconductor material. For example, the perimeter portion 250 could be doped with an n-type dopant. The central portion 230 could be doped with either an n-type dopant or a p-type dopant. The doped regions can be formed by known microelectronic-device fabrication techniques, such as ion implantation or diffusion. The doped regions preferably do not extend through the entire circumference of the microdisk structure but rather exist only as isolated regions. Those isolated regions correspond to the optical-coupling regions and the phase-shifting regions of the microdisk, as illustrated in FIG. 1 and FIG. 3.

With continuing reference to FIG. 2, metal contacts 220, 240 are preferably formed over the tops of the doped regions 230, 250. These metal contacts can be connected, by means of metal interconnect patterns (not shown), to additional metal contact pads (not shown) that are located somewhere on the dielectric substrate surface. Wires can be attached to those contact pads and also can connect to external electrical circuits that supply the voltage or current.

As an example, the central doped region 230 can be p-type and the perimeter doped region 250 can be n-type. This forms a P-i-N electrical diode. When a reverse bias voltage is applied to this diode, an electric field is established across the region of undoped semiconductor material. This electric field changes the optical refractive index of the material as a result of the electro-optic effect. Application of a larger bias voltage results in a larger electric field and a corresponding larger change in the refractive index. The whispering gallery optical mode 280 responds to this change in refractive index, and the propagation velocity through that portion of the microdisk structure is changed.

In an optical-coupling region 210, the whispering gallery optical mode 280 and the waveguided optical mode 290 are preferably both present. Both of these optical modes have associated with them an effective propagation constant (or effective mode index). The thickness of the semiconductor layer can be chosen such that the effective propagation constant of the whispering gallery optical mode is approximately the same as the effective propagation constant of the waveguided optical mode. The thickness of the dielectric material 275 between the waveguide core region 260 and the semiconductor layer 200 can be chosen such that the whispering gallery optical mode and the waveguide optical mode partially overlap each other.

In some embodiments, light power can be coupled effectively between the whispering gallery optical mode 280 and the waveguided optical mode 290 because these two modes overlap each other and because these two modes have approximately the same propagation constant. The amount of light power that is coupled will depend on the length of that interaction, which relates closely to the length of that optical coupling region. However, when the refractive index of the semiconductor layer is changed, as a result of the applied voltage or current, for example, the effective propagation constant of the whispering gallery optical mode is changed. The two optical modes would then not have the same propagation constant and, thus, the effectiveness of their light power exchange would be expected to be reduced.

If the refractive index of the semiconductor layer is increased, the propagation constant is reduced and light will tend to be coupled into the whispering gallery optical mode. Conversely, if the refractive index of the semiconductor layer is reduced, light will tend to be coupled away from the whispering gallery optical mode. Thus, the amount of light that is coupled into (or out from) a microdisk and out from (or into) its I/O waveguide can be controlled by means of the applied voltage or current. In some embodiments, it is desirable to set the length of the coupling region to optimally transfer the light from the waveguide into the microdisk (or conversely from the microdisk into the waveguide) when zero voltage or current is applied. An applied voltage or current can then be conveniently used to modulate this transfer of the light.

Figure 4:
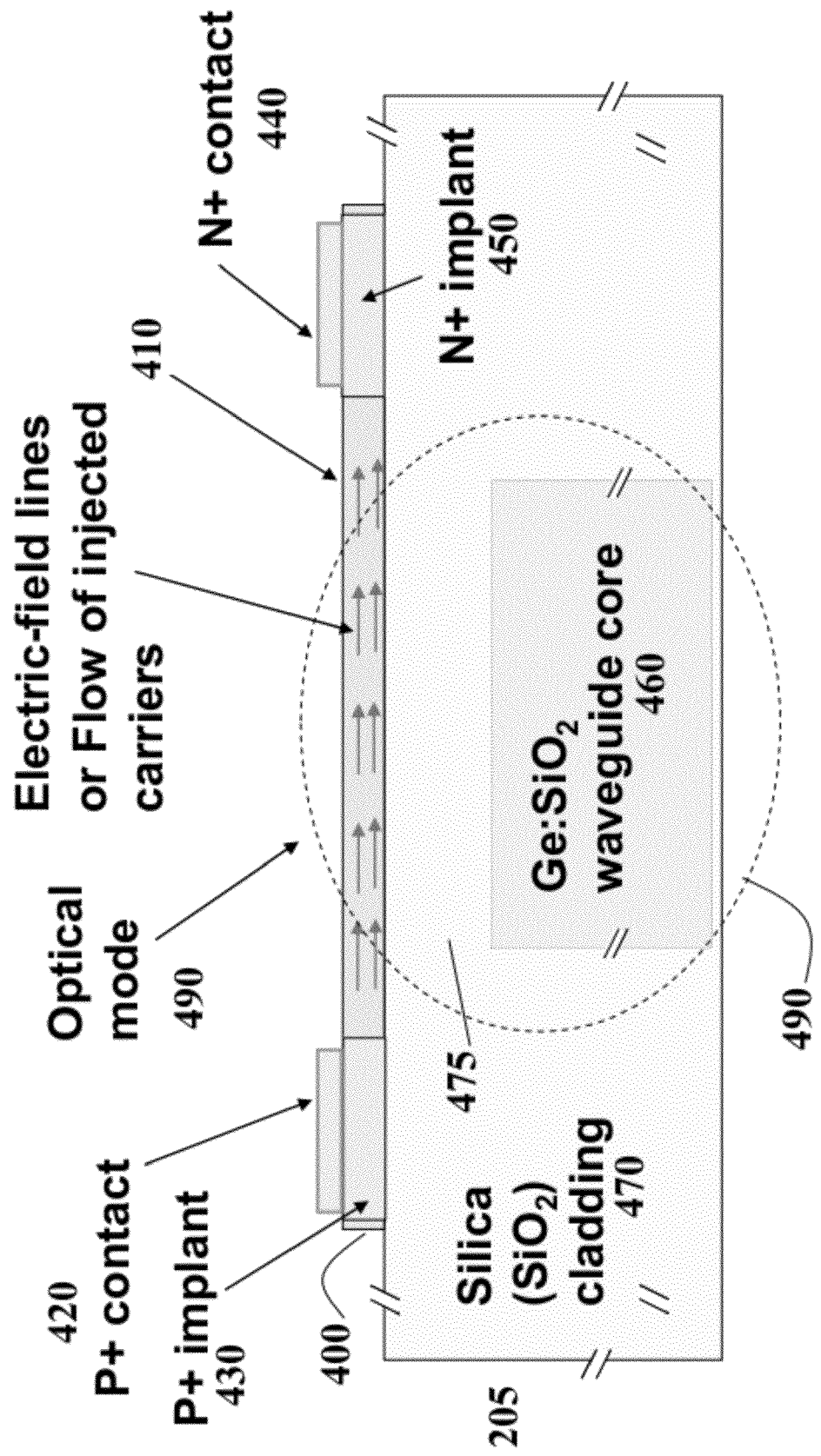
FIG. 4 is a cross-sectional illustration of an optical phase shifter of the unit cell according to some embodiments.

FIG. 4 shows the cross section of an optical phase shifter 120, 320 that could be present in some unit-cell embodiments. The phase shifter here consists of an optical waveguide that has a higher-refractive-index dielectric core region 460 surrounded by the lower-refractive-index material 470 of the dielectric substrate 205. The dimensions of the optical waveguide of the phase shifter are generally (but not necessarily) identical to those of the optical waveguide of the microdisk. A thin layer of semiconductor material 400 lies above the optical waveguide. The thickness of this semiconductor layer typically is less than 0.1 μm.

This semiconductor layer in FIG. 4 has a central portion 410, located directly over the waveguide core region 460, which is undoped. The semiconductor layer also has other portions 430, 450, located on either side of the undoped region, that are doped. One of those doped regions (e.g. 450) is preferably doped n-type and the other of those doped regions (e.g. 430) can be doped n-type or p-type. The waveguided optical mode 490 in the phase shifter can have a substantially elliptical shape and extend over the waveguide core region 460 as well as into the semiconductor layer 400, in some embodiments.

Like the microdisk, metal contacts 420, 440 are formed over the tops of the doped regions 430, 450 in the optical phase shifter. These metal contacts 420, 440 can be connected, by means of metal interconnect patterns, to additional metal contact pads (not shown) that are located somewhere on the dielectric substrate surface. Wires can be attached to those contact pads and also connect to external electrical circuits that supply the voltage or current. As an example, one doped region can be p-type and the other doped region can be n-type (a P-i-N electrical diode). When a reverse bias voltage is applied to this diode, an electric field is established across the region of undoped semiconductor material. This electric field changes the optical refractive index of the material, and allows for a net change of the optical phase of the light that has passed through the phase shifter.

As another example, the central doped region 230 of a microdisk can be n-type and the perimeter doped region 250 can also be n-type (an N-i-N electrical-current injector). When an electrical current is supplied to this device, electrical charge carriers are injected from a doped region into the undoped region. The additional electrical carriers injected into the undoped region act to decrease the optical refractive index of that undoped semiconductor material, because of the free-carrier or plasma effect. This reduction of the optical refractive index changes the propagation velocity of the whispering gallery optical mode 280 in that region. Similarly, when the N-i-N structure is formed in an optical phase shifter, application of an electrical current to that structure can change the optical phase of the light that has propagated through that phase shifter.

In some embodiments, a P-i-N structure also can be used to inject electrical charge carriers into an undoped region, by applying a forward bias voltage to the P-i-N diode.

The optical phase shifter preferably has a central portion (as seen from a top view shown in FIGS. 1 and 3) and two end portions. The cross section shown in FIG. 4 is of the central portion. In the end portions, the width of the semiconductor layer preferably is reduced gradually, with the width of the doped regions being reduced first and then the width of the undoped region also being reduced, until there is no semiconductor layer. This tapering of the semiconductor layer can be effective in gradually coupling the light upward to overlap the semiconductor layer and then downward back to the dielectric waveguide. The tapered configuration can be desirable for reducing the optical scattering loss that might occur at an abrupt transition between sections of passive optical waveguide and the active phase shifter.

Figure 5:
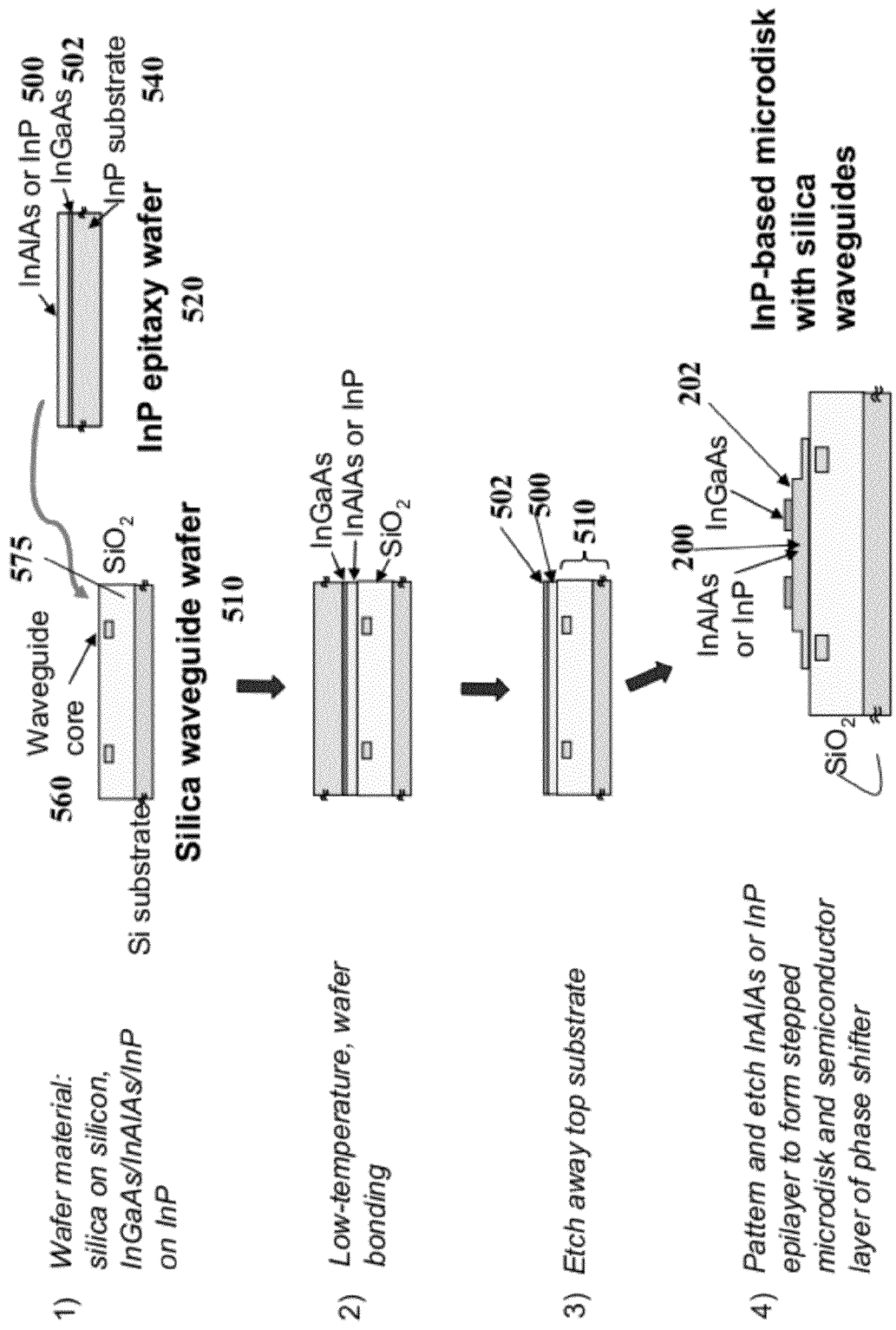
FIG. 5 summarizes an exemplary process for fabricating a microdisk and optical phase shifter of a unit cell, in certain embodiments.

FIG. 5 depicts an exemplary process that can be used to fabricate a unit cell according to the invention. Such a process also can be used to fabricate a programmable filter or signal processor that comprises multiple unit cells.

In some embodiments, the process begins with the procurement or fabrication of a wafer 510 of dielectric waveguides, such as silica on silicon waveguides, and a wafer 520 of semiconductor epitaxial material. As is known, both of these wafers can be purchased commercially (from e.g. Applied Materials, California, U.S.). The dielectric waveguides can be made to have some desired physical pattern, such as those shown in subsequent drawings that describe exemplary optical-filter configurations. The dielectric waveguide wafer can be lapped and polished to ensure that it has a very flat surface and to achieve a specific thickness for the layer 275, 475, 575 of dielectric substrate material that is above the waveguide core regions 260, 460, 560.

On the semiconductor substrate, a layer 502 of stop-etch material is grown, and then the undoped semiconductor layer 200, 400, 500 used in the optical phase modulator and the microdisk is grown. Epitaxial growth is an effective technique to obtain a precise thickness for each of the semiconductor layers. The two wafers 510 and 520 are then wafer bonded, top-face to top-face, using known techniques for wafer bonding of a semiconductor material such as InP or GaAs to an oxide such as silicon dioxide. Next, the substrate 540 of the semiconductor epitaxial wafer is removed, generally by known lapping or grinding processes and then by known chemical etching processes. The stop-etch layer 502 serves to control the removal of the substrate 540 material and to protect the desired undoped semiconductor layer 500. The stop-etch layer 502 is then removed by selective etchants to expose the undoped semiconductor layer 500 that resides above and is bonded to the dielectric waveguide wafer 510.

A subsequent processing step, in preferred embodiments, is to etch the pedestal 202 in the semiconductor layer 200 of the microdisk structure. This processing step also preferably thins the semiconductor layer of the optical phase shifter. Next, the rest of the semiconductor layer in etched away where it is not needed (and also to define the tapers in the phase shifter). Well-known photolithography and etching techniques can be used for these processing steps. The regions 230, 250, 430, 450 of doped semiconductor are then formed by ion-implantation, diffusion, or by some other technique.

Then, patterns of metal ohmic contacts 220, 240, 420, 440 can be formed over the doped regions. Contact pads also are formed for the external electrical connections such as wire bonds. These contact pads can be formed on the regions of exposed dielectric surface that are not used for the optical waveguides. Finally, metal interconnect lines can be formed by known means to interconnect the ohmic contact with the contact pads.

Figure 6:
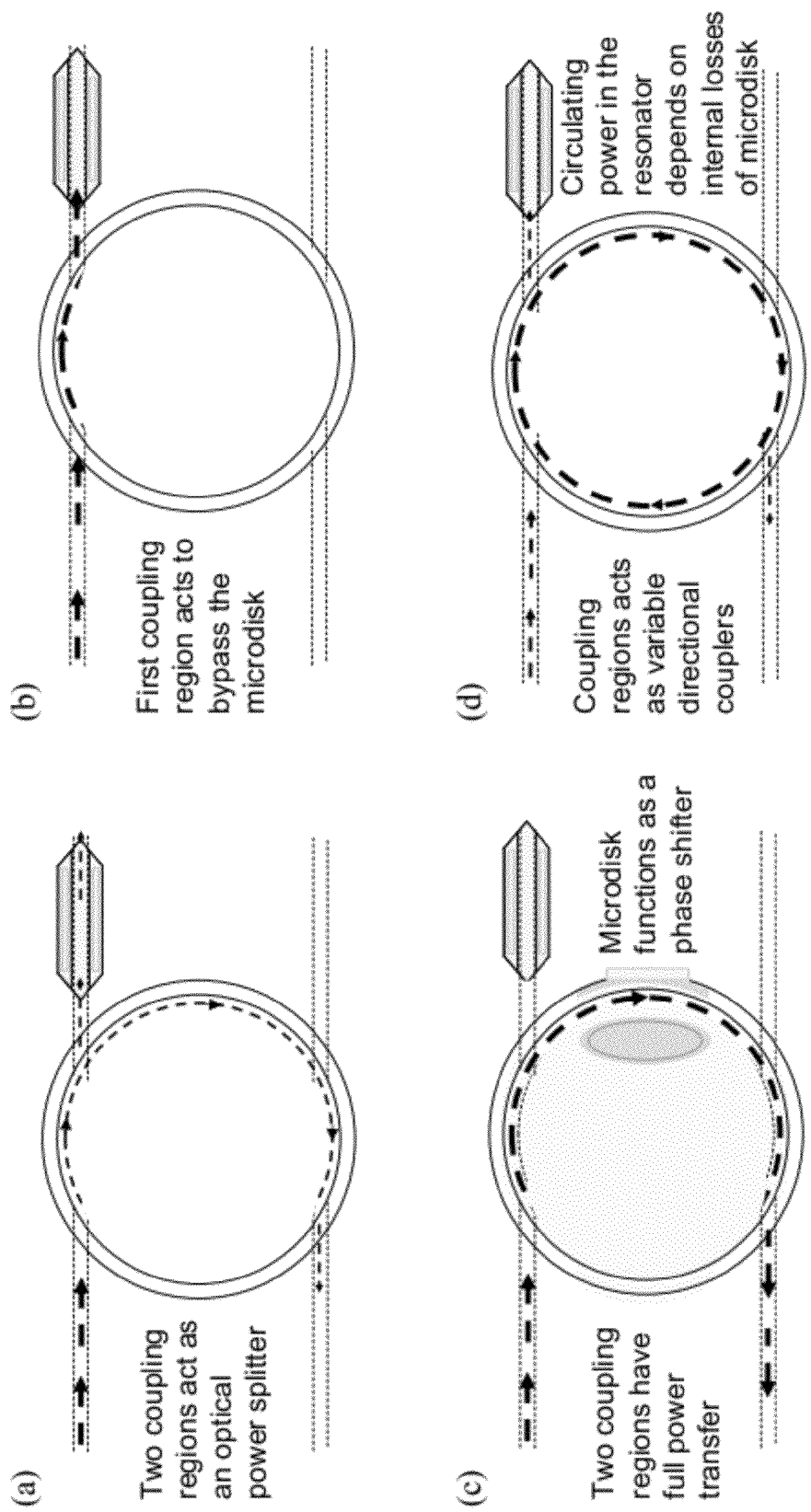
FIG. 6 illustrates several different functional devices that can be achieved by programming the control parameters of a common unit cell.

The programmable unit cell can be a versatile component. FIG. 6 illustrates several different functional devices that can be achieved by programming the control parameters of the same unit cell. The unit cell can act as a power splitter (FIG. 6a) with programmable splitting ratio; the unit cell can completely bypass the microdisk (FIG. 6b); the unit cell can bypass the separate phase shifter (FIG. 6c); and/or the unit cell can act as a recursive delay line (FIG. 6d) with one or two outputs whose relative phase can be controlled. The microdisk in the recursive delay line acts as a resonator.

Optical delay-line filters can be obtained by constructing a set of multiple unit cells that are optically connected by optical waveguides. The interconnecting optical waveguides are essentially extensions of the input/output waveguides or waveguide sections of the optical phase shifter and the microdisk. In designing optical delay-line filters, it can be convenient to use an intermediate construct or building block and then to cascade those building blocks to form a lattice structure.

One common example of a building block is an asymmetric Mach-Zehnder interferometer whose two arms have differing lengths. The asymmetric Mach-Zehnder interferometer is a typical building block for a FIR filter. Other common building blocks add a ring resonator to one arm, or to both arms, of a Mach-Zehnder interferometer. These building blocks are typically used to form IIR filters.

Figure 7:
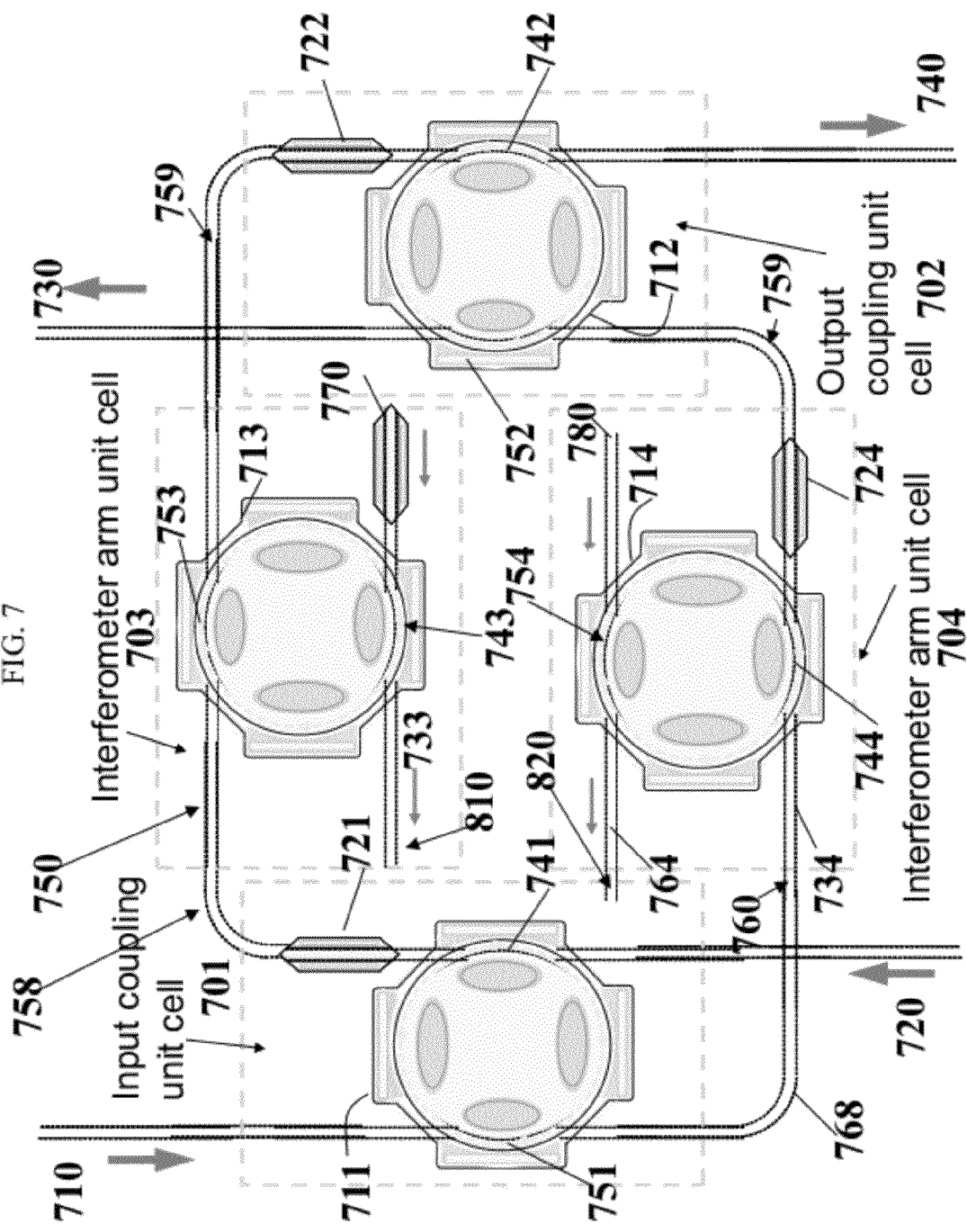
FIG. 7 depicts a versatile building block realized by an interconnection of four unit cells, according to some embodiments.

FIG. 7 shows an exemplary, versatile building block that is obtained by combining four unit cells 701, 702, 703, 704. This building block is essentially a four-cell signal processor and has two primary input optical waveguide sections 710, 720 and two primary output optical waveguide sections 730, 740. This four-cell signal processor can function as a 2×2 filter structure. One unit cell 701 is used as a programmable 2×2 input optical coupler or switch. Another unit cell 702 is used as a programmable 2×2 output optical coupler or switch. When the unit cells 701, 702 are used as an optical coupler, this building block filter has a Mach-Zehnder interferometer configuration comprising the input and output couplers and two optical paths 750, 760 (or arms) between those couplers. The other two unit cells 703, 704 are placed one in each of the two optical paths 750, 760. There is, thus, a programmable optical microdisk in each of the two arms of the Mach-Zehnder interferometer, in the embodiment described by FIG. 7. There also is a programmable optical phase shifter in at least one of these two arms.

Continuing with FIG. 7, the microdisk 711 in the input coupler 701 can be programmed to function as a 2×2 optical power splitter, with variable power splitting ratio, or as a 2×2 optical path switch. The length of the optical waveguide section 768 connecting unit cell 701 to unit cell 704, the length of the optical waveguide section 758 connecting unit cell 701 to unit cell 703, and the optical phase shifter 721 in that unit cell 701 can be used to establish the relative optical phase delay between the inputs of the two interferometer paths 750, 760. When a unit cell is used as an optical path switch, both coupling regions of the microdisk in that unit cell are operated either in a fully uncoupled state, with little light transferred between the I/O waveguide and the circular path; or in a fully coupled state, with maximal transfer of light between the I/O waveguide and the circular path.

In an alternative programming of the unit cells of FIGS. 1-4, the microdisk 712 in the output coupler 702 can be programmed to function as a 2×2 optical power combiner, with variable power combining ratio, or as a 2×2 optical path switch. The length of the optical waveguide section 769 connecting unit cell 702 to unit cell 704, the length of the optical waveguide section 759 connecting unit cell 702 to unit cell 703, and the optical phase shifter 722 in that unit cell 702 can be used to establish the relative optical phase delay between the outputs of the two interferometer paths 750, 760. When a unit cell is used as an optical path switch, both coupling regions of the microdisk in that unit cell are operated either in a fully uncoupled state, with little light transferred between the I/O waveguide and the circular path; or in a fully coupled state, with maximal transfer of light between the I/O waveguide and the circular path.

The microdisks 713, 714 in the two arms of the programmable building block of FIG. 7 can be operated as ring resonators. In such an embodiment, the building block is a fully reconfigurable optical delay-line filter that can have two poles and two zeroes in its characteristic mathematical function. The locations of these poles and zeroes and the coefficients of the characteristic function can be changed by adjusting the coupling coefficients of the coupling regions 744, 753 between the two microdisks 713, 714 and the two interferometer arms 750, 760 (which includes input/output waveguides coupled to these microdisks 713, 714); the resonance frequency of those microdisks 713, 714 (by means of the resistive heater or phase-shifting sections in these microdisks); the phase shift produced by the optical phase shifters 724, 722; and the coupling coefficients of the coupling regions in 741, 751, 742, 752 of the microdisks 711, 712 that are used as the 2×2 input and output couplers.

Figure 8:
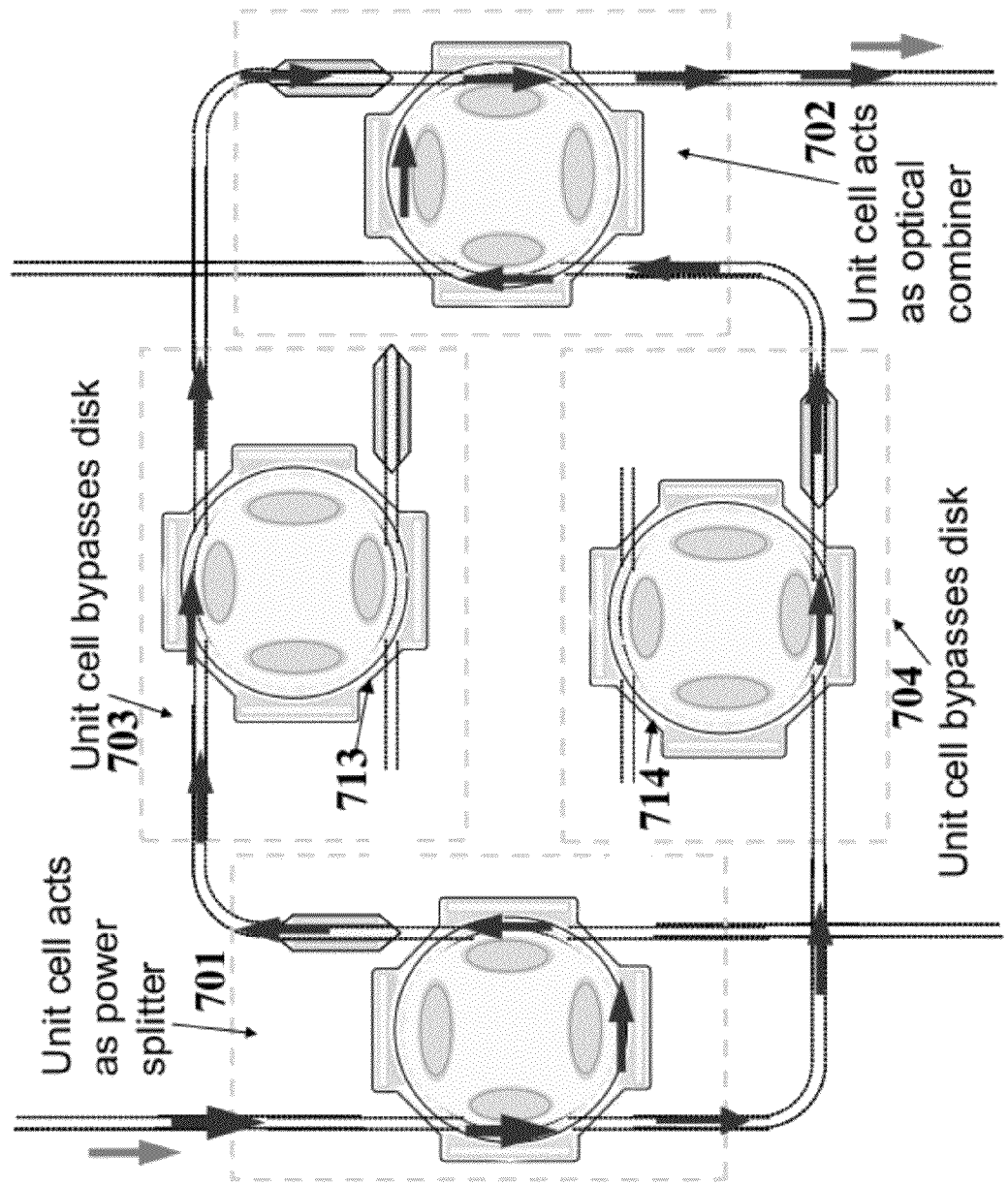
FIG. 8 is a certain embodiment of the filter structure of FIG. 7, operating as a 2×2 FIR building block.

FIG. 8 illustrates a building block operating as a FIR filter stage. The unit cells at the input and the output act like the 2×2 optical couplers of a Mach-Zehnder interferometer. The unit cells 703, 704 on the two arms of the interferometer bypass their microdisks 713, 714. By having the light travel paths of differing length before that light reaches the final coupling region of the output unit cell 702, this interferometer is made asymmetric, as is typically desired. The difference between those path lengths is the time-delay increment for this filter stage. These filter stages can be cascaded together to form a lattice structure for higher-order filtering response. Each interferometer arm has a variable optical phase shifter, and the coupling ratios of the input and output couplers can be varied.

Figure 9:
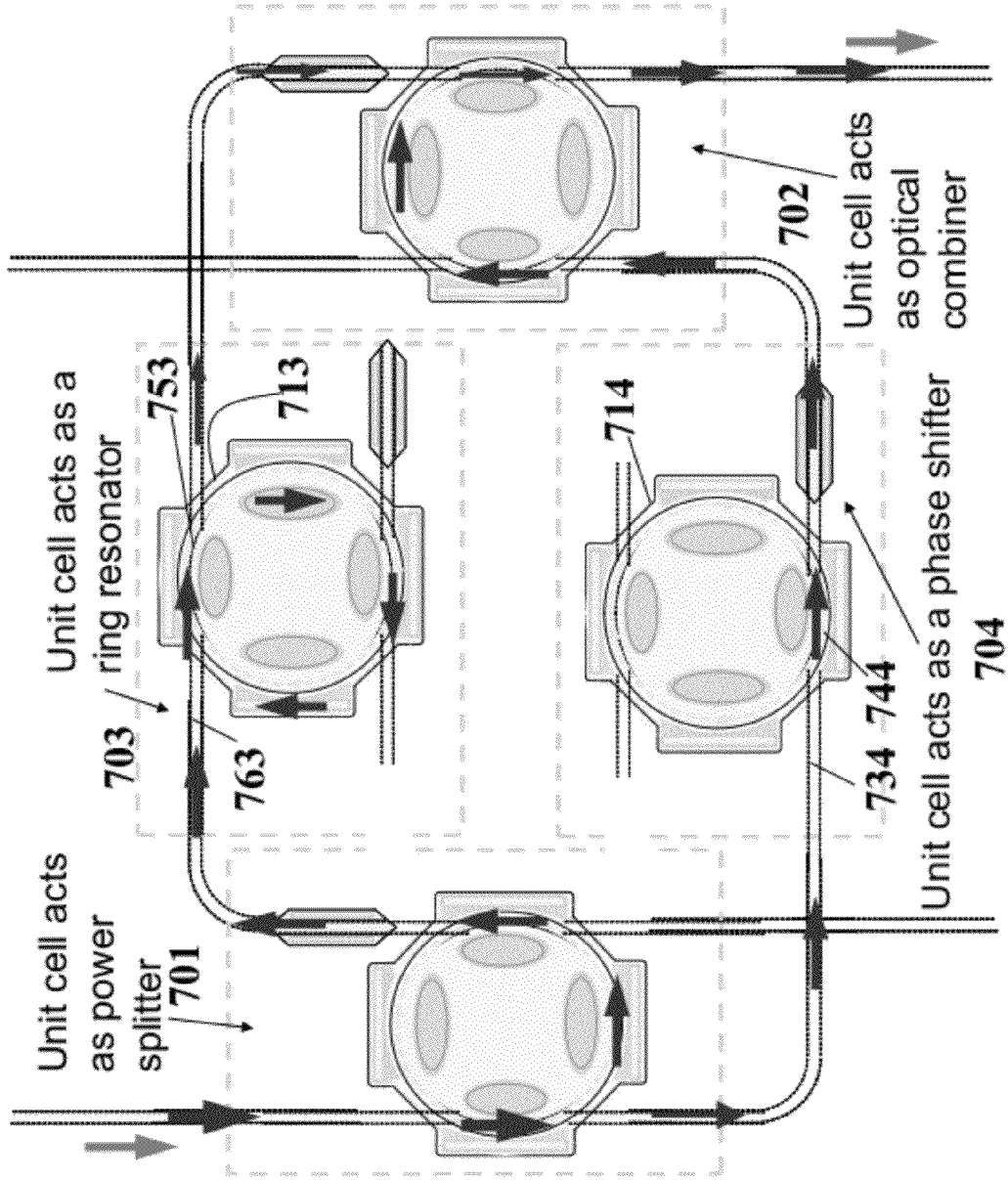
FIG. 9 is a certain embodiment of the filter structure of FIG. 7, operating as a 2×2 IIR building block.

FIG. 9 illustrates a simple IIR filter that has a ring resonator on one interferometer arm and a phase shifter on the other interferometer arm. Such filters can be cascaded to form a lattice structure having high-order filtering characteristics. Filter design techniques, such as those described in U.S. Patent App. No. 61/028,625 (which has been incorporated by reference herein above), can be used to select parameter values for a given desired filter characteristic.

For this example, coupling region 753 in the microdisk 713 of unit cell 703 is programmed to couple light between the input/output waveguide 763 and microdisk 713, with microdisk 713 acting as an optical resonator. On the other hand, coupling region 744 in the microdisk 714 of unit cell 704 is programmed such that light is not coupled between input/output waveguide 734 and microdisk 714.

The building block of FIG. 7 also contains two secondary input waveguide sections 770, 780 and two secondary output waveguide sections 810, 820. These secondary waveguide sections can be used in some filter designs and are not used in other filter designs, such as those illustrated in FIGS. 8 and 9. When these secondary waveguide sections are not used, the optical coupling regions 743, 754 corresponding to those waveguides can be programmed to suppress the coupling of light between the microdisk structure 713, 714 and their waveguides 733, 764. This can be accomplished, for example, by applying a sufficiently large voltage across those coupling regions 743, 754 such that the coupling is suppressed because the propagation constants of the whispering gallery optical mode and the waveguided optical mode are sufficiently different.

In some embodiments, the optical phase in the two arms of the interferometer can be controlled and matched within a period of the optical wavelength. Thus, a coherent delay-line filter can be achieved. However, the lengths of the two optical paths represented by those two arms are not usually equal. Other building blocks can be designed to have time-delay-matched optical paths, if that is desired for a certain application.

Figure 10:
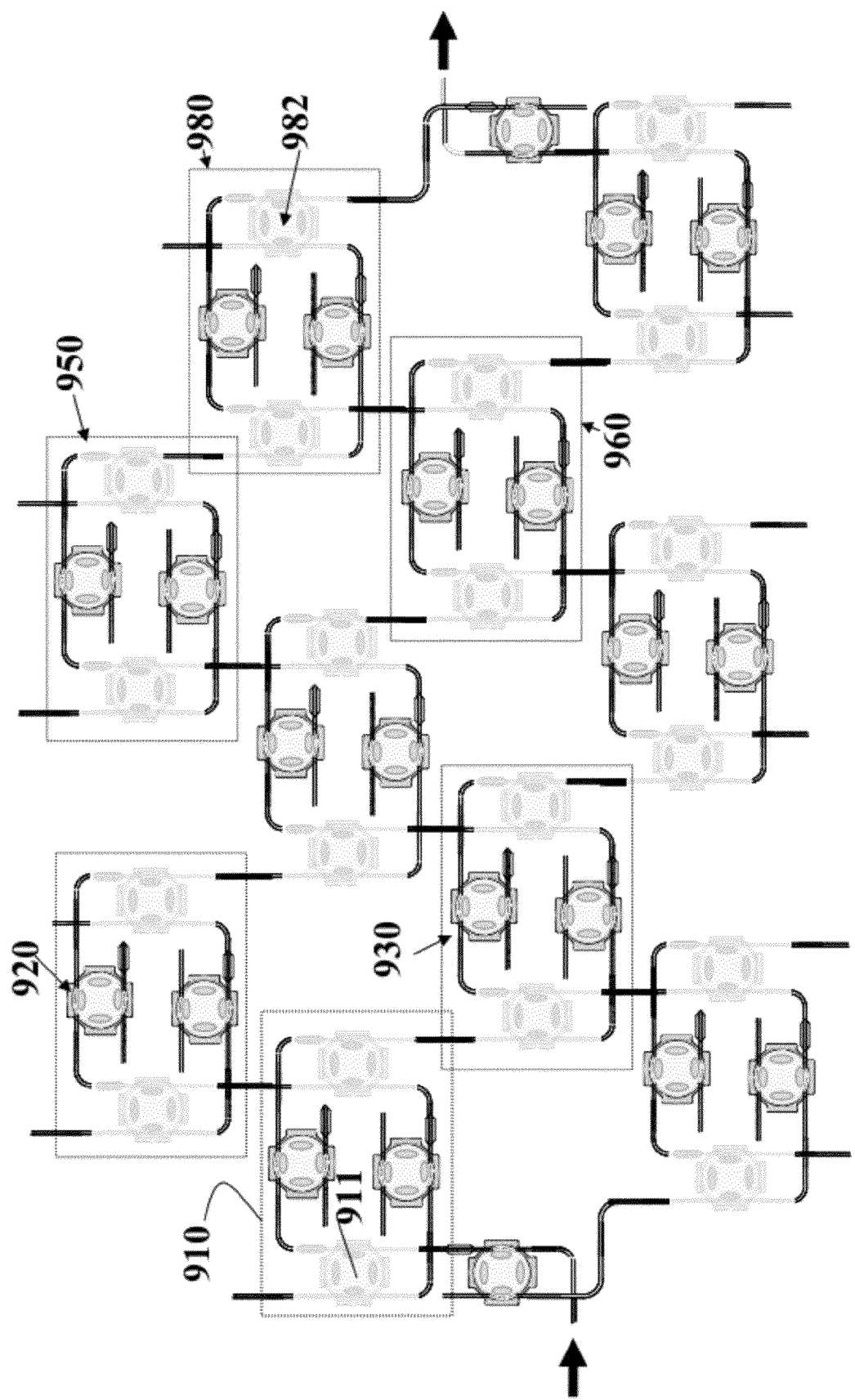
FIG. 10 illustrates an exemplary programmable filter obtained by a two-dimensional interconnection of the versatile building block of FIG. 7 used as 2×2 building-block filters.

FIG. 10 illustrates, as an example, part of a programmable filter that is constructed from a combination of multiple four-unit-cell building blocks similar to those shown in FIG. 7. This filter is a two-dimensional construction or array of unit cells. The filter can function, for example, as a transversal filter, with multiple parallel delay-line paths. A transversal filter configuration can be achieved by operating the unit cell 911 at the input of the leftmost four-cell building block 910 as an optical power splitter. If the other three unit cells of this building block are programmed to bypass the microdisks, this building block acts like a 1×2 power splitter. Power splitters with more branches or taps can be obtained by cascading building block 910 to building block 920 and 930, and by also operating the building blocks as 1×2 power splitters, thereby forming a branching network of such 1×2 power splitters. An alternative transversal filter configuration can be achieved by operating the unit cell 982 at the output of the rightmost four-cell building block 980 in FIG. 7 as an optical power combiner. If the other three unit cells of this building block are programmed to bypass the microdisks, this building block acts like a 2×1 power combiner. Power combiners with more branches or taps can be obtained by cascading building block 980 to building block 950 and 960, and by also operating the building blocks as 2×1 power combiners, thereby forming a branching network of such 2×1 power combiners.

The programmable filter according to FIG. 10 also can function as a lattice filter, with multiple cascaded, selectable delay-line paths. A lattice filter can be achieved by routing the optical signal from one building block stage to another in cascade manner, with the input and output couplers of each building block stage acting like optical directional couplers.

Since the input and output couplers of each building block are fully programmable, those couplers also can function as optical path switches. Thus, they can be used to direct the light into a particular building block filter or to divert the light away from another building block filter. This capability is useful when a building block contains a faulty unit cell. That faulty building block can then be bypassed.

The filter of FIG. 10 makes use of only the primary input and output waveguide sections of the building block of FIG. 7. When secondary input and output waveguide sections also are present and utilized, the filter can have additional capability. For example, each unit cell can be programmed to function as an optical switch, an optical coupler, or an optical resonator.

Figure 11:
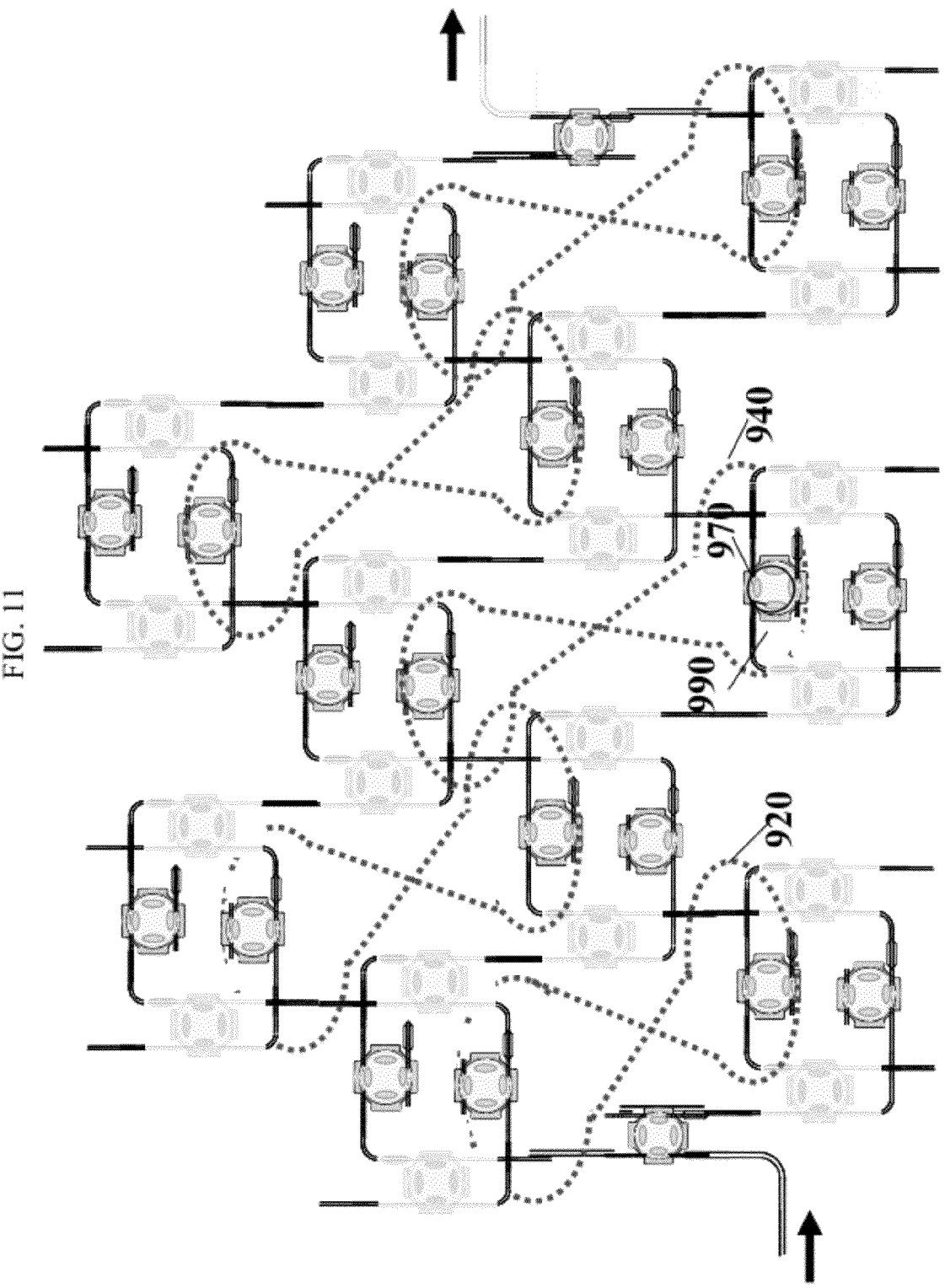
FIG. 11 depicts an exemplary programmable filter obtained by a two-dimensional interconnection of the versatile building block of FIG. 7 used as 4×4 building-block filters.

FIG. 11 shows part of an exemplary filter that contains nested delay paths. In this example, the light can be routed (by a microdisk functioning as a switch or coupler) into a "figure-eight" shaped waveguide delay path 920. The light also can be delayed with the same microdisk operating as an optical resonator. Note that the figure-eight delay path can be designed to return the light back into the same microdisk. Thus, the same microdisk (e.g. 990) can control two nested resonators, or recursive optical-delay lines, that have different round trip times. One resonator loop can be the circular path (e.g. 970) in that microdisk (e.g. 990) and the other resonator loop can be the figure-eight delay path (e.g. 940) coupled to that microdisk.

Such combinations of different round trip times are useful for constructing Vernier-effect filters. Vernier effect filters can achieve narrow passbands and yet very large frequency separation between successive occurrences of the passbands.

Various uses and applications of certain embodiments of the present invention will now be further described. It will be understood by one of ordinary skill in the art that the scope of the invention extends beyond the specific uses described herein.

Some embodiments of the present invention make use of an array of programmable unit cells to accomplish optical-domain signal processing. The optical signal processor can be constructed by a regular array of versatile unit cells whose function can be changed by adjusting the values of its control parameters. When the unit cell does not include any memory capability, the electrical voltages or currents for control parameters must be supplied continually. However, in some embodiments, as will be recognized by a person of skill in this art, electronic memory capability can be added to the electronic circuit that supplies the voltages and currents in order to program and control the optoelectronic unit cell.

Several exemplary two-dimensional arrangements and interconnections of unit cells have been described that can perform a large variety of filtering functions. With a combination of multiple unit cells of this invention, it is possible to achieve FIR filters, IIR filters, and combinations of FIR and IIR filters. An optical FIR delay-line filter has no return path in the optical circuit and its impulse response is limited, being finite in time. An optical IIR delay-line filter has one or more return paths in its optical circuit and its impulse response continues to infinite time.

According to the present invention, filters of high order (having many poles and zeroes in their mathematical description) can be achieved by including more unit cells and interconnecting those unit cells with optical waveguides. Despite the unit cell of the invention being simple—comprising one microdisk, one phase modulator, and at least one I/O waveguide—filters constructed from a combination of multiple unit cells can be quite complicated. Also, different filtering functions can be achieved simply by reprogramming a prescribed combination and interconnection arrangement of multiple unit cells each having the same physical construction.

Filters that can be constructed include Chebyshev filters, Butterworth filters, and elliptic filters, having various frequency-response characteristics, and reconfigurable filters, with real-time changeable frequency-response characteristics.

In various embodiments described above or otherwise described and enabled by the invention as claimed, two-dimensional arrangements provide capabilities that are not possible with one-dimensional (cascade) arrangements or with branching or tapped (transversal) arrangements that have multiple parallel delay lines. For example, the same (or substantially the same) two-dimensional arrangement of unit cells of the present invention can be programmed to achieve a FIR transversal filter form, a FIR lattice filter form, or an IIR filter form. Also, 4-unit-cell building blocks can be programmed as 1-to-2 or 1-to-4 optical power splitters or as 2-to-1 or 4-to-1 optical combiners or couplers.

Additional capabilities include the provision of bypass paths for routing the optical signal around faulty unit cells or filter blocks, the capability to perform both serial and parallel processing, and the ability to have nested delay-line processes (such as used in Vernier-effect filters).

It will be evident to a skilled artisan from the examples (as described in the drawings and accompanying text above) that a variety of optical delay-line filters can be obtained by configuring multiple unit cells interconnected by optical waveguide extensions of the input and output waveguide sections of those unit cells. As illustrated by the examples of FIGS. 10 and 11, it is possible to achieve very different filter types using the same physical arrangement of unit cells. Optical delay-line filters are merely one example of signal processors that can be provided by this invention.

One may choose to construct the filters by means of building block filters, such as a $4^{th}$-order building block provided above as an example (see FIGS. 10 and 11). Conversely, one may choose to design a filter by implementing the unit cell as the basic construction element. In making the filters, one may choose to make all of the microdisks have the same physical size. One also may choose to have different microdisks have different physical sizes.

The programmable, unit-cell-based filters described herein have applicability in optical telecommunications, as equalizers for wavelength multiplexed networks, or to select specific wavelength channels. Filters of this invention also have applicability in radio frequency (RF) systems that involve optical fiber for distancing or electrically isolating an RF sensor (such as an antenna) from the electronic signal processor. The optical-domain filters of the present invention can be used to preprocess RF-modulated optical signals before those signals are converted back into the RF domain.

In this detailed description, reference has been made to multiple embodiments and to the accompanying drawings in which is shown by way of illustration specific exemplary embodiments in which the invention may be practiced. These embodiments are described in sufficient detail to enable those skilled in the art to practice the invention, and it is to be understood that modifications to the various disclosed embodiments may be made by a skilled artisan.

The embodiments, examples, variations, and figures described above should provide an indication of the utility and versatility of the present invention. Of course, many more devices can be developed that involve combinations of unit cells as provided herein. Other embodiments that do not provide all of the features and advantages set forth herein may also be utilized, without departing from the spirit and scope of the present invention. Such modifications and variations are considered to be within the scope of the invention defined by the appended claims.

What is claimed is:

1. A method of constructing an optical signal processor comprising a plurality of programmable unit cells, said method comprising:
   (i) providing a plurality of unit cells, wherein each unit cell includes an optical microdisk including a circular path, an optical phase shifter, a first input/output optical waveguide, and a second input/output optical waveguide, wherein said microdisk and said phase shifter are optically connected by means of said first input/output optical waveguide, and wherein said second input/output optical waveguide is optically connected to said microdisk;
   (ii) interconnecting at least some of said plurality of unit cells with a plurality of optical waveguides, said plurality of optical waveguides being connected to said at least some of said plurality of unit cells by means of said first and second input/output optical waveguides in said unit cells;
   (iii) in each of said plurality of unit cells, providing a thin layer of semiconductor material, having an undoped region and a doped region, in optical connection with at least one of said input/output optical waveguides, to program each of said plurality of unit cells by electrically energizing said undoped and doped regions of said semiconductor material; and
   (iv) programming a first unit cell of said plurality of unit cells to accomplish a first function comprising an optical coupler including two inputs and two outputs, wherein said first unit cell includes two coupling regions, and wherein said two coupling regions are programmed to establish the relative amount of power coupled between each of said first and second input/output waveguides and said circular path in said first unit cell.

2. The method of claim 1, said method further comprising programming a second unit cell of said plurality of unit cells to accomplish a second function that is different than said first function.

3. The method of claim 2, wherein each of said first and second unit cells is separately programmed to function as an optical switch, an optical coupler, or an optical resonator.

4. The method of claim 2, wherein said second function comprises an optical power splitter; wherein said second unit cell includes a first and second coupling region, said first coupling region partially couples light between said first input/output optical waveguide and said circular path of said second unit cell, and said second coupling region fully couples light between said circular path and said second input/output optical waveguide.

5. The method of claim 2, wherein said second function comprises an optical power combiner; wherein said second unit cell includes first and second coupling regions, said first coupling region couples light from said first input/output optical waveguide into said circular path of said second unit cell, and said second coupling region fully couples light from said circular path to said second input/output optical waveguide.

6. The method of claim 2, wherein said second function comprises a recursive delay line; wherein said second unit cell includes first and second coupling regions, said first coupling region couples light between said first input/output optical waveguide and said circular path of said second unit cell, and said second coupling region does not couple light between said circular path and said second input/output optical waveguide.

7. The method of claim 2, wherein said second function comprises an optical path switch; wherein said second unit cell includes first and second coupling regions, and said first and second coupling regions either (a) fully couple light between said first and second input/output optical waveguide and said circular path of said second unit cell, or (b) do not couple light between said first and second input/output optical waveguide and said circular path of said microdisk of said second unit cell.

8. The method of claim 2, wherein said second function comprises an optical phase shifter; wherein said second unit cell includes first and second coupling regions, and said first and second coupling regions do not couple light between first and/or second input/output optical waveguide and said circular path of said second unit cell.

9. The method of claim 1, wherein an electronic circuit with electronic memory capability is used for said electrically energizing said undoped and doped regions of said semiconductor material.

10. The method of claim 1, wherein said plurality of unit cells is present as 4-unit-cell building blocks.

11. The method of claim 1, said method further comprising providing bypass paths for routing light around faulty unit cells.

12. A method of constructing an optical signal processor comprising a plurality of programmable unit cells, said method comprising:
(i) providing a plurality of unit cells, wherein each unit cell includes an optical microdisk including a circular path, an optical phase shifter, a first input/output optical waveguide, and a second input/output optical waveguide, wherein said microdisk and said phase shifter are optically connected by means of said first input/output optical waveguide, and wherein said second input/output optical waveguide is optically connected to said microdisk; and
(ii) interconnecting a first unit cell and a second unit cell of said plurality of unit cells by means of said first input/output optical waveguide of said first unit cell and said second input/output optical waveguide of said second unit cell, wherein light output from said first unit cell is coupled to said second unit cell via said first input/output waveguide of said first unit cell and said second input/output waveguide of said second unit cell, and light output from said second unit cell is coupled to said first unit cell via said second input/output waveguide of said second unit cell and said first input/output waveguide of said first unit cell;
wherein said first unit cell has a first function comprising a 2×2 optical coupler.

13. The method of claim 12, wherein said second unit cell has a second function that is different than said first function.

14. The method of claim 13, wherein said second function is selected from the group consisting of an optical power splitter, an optical power combiner, an optical path switch, and an optical phase shifter.

15. The method of claim 13, said method further comprising interconnecting a third unit cell of said plurality of unit cells to said first unit cell, wherein light output from said third unit cell is coupled to said first unit cell via said second input/output waveguide of said first unit cell.

16. The method of claim 13, said method further comprising, in each of said plurality of unit cells, providing a thin layer of semiconductor material, having an undoped region and a doped region, in optical connection with at least one of said input/output optical waveguides, to program each of said plurality of unit cells by electrically energizing said undoped and doped regions of said semiconductor material.

17. The method of claim 16, wherein said first unit cell is programmed to accomplish said first function comprising said 2×2 optical coupler including two inputs and two outputs; wherein said first unit cell includes two coupling regions programmed to establish the relative amount of power coupled between each of said first and second input/output waveguides and said circular path in said first unit cell; and wherein said second unit cell is programmed to accomplish a second function.

18. The method of claim 17, said method comprising programming said second function as a recursive delay line; wherein said second unit cell includes first and second coupling regions, said first coupling region couples light between said second input/output optical waveguide and said circular path of said second unit cell, and said second coupling region couples light between said circular path and said first input/output waveguide of said second unit cell.

19. The method of claim 12, said method comprising programming said first unit cell and said second unit cell to function as nested resonators, wherein said second unit cell includes first and second coupling regions; wherein said first coupling region of said second unit cell is programmed to couple light between said second input/output waveguide and said circular path of said second unit cell, and said second coupling region of said second unit cell is programmed to couple light between said circular path and said first input/output waveguide of said first unit cell.

20. A method of optical signal processing, said method comprising:
(i) providing an interconnection arrangement of multiple unit cells each having the same physical construction, wherein each unit cell includes an optical microdisk including a circular path, an optical phase shifter, a first input/output optical waveguide, and a second input/output optical waveguide, wherein said microdisk and said phase shifter are optically connected by means of said first input/output optical waveguide, and wherein said second input/output optical waveguide is optically connected to said microdisk;
(ii) providing an interconnection of a first unit cell and a second unit cell of said plurality of unit cells by means of said first input/output optical waveguide of said first unit cell and said second input/output optical waveguide of said second unit cell, wherein light output from said first unit cell is coupled via said first and second input/output waveguides to said second unit cell, and light output from said second unit cell is coupled via those said first and second input/output waveguides to said first unit cell;
(iii) in each of said plurality of unit cells, providing a thin layer of semiconductor material, having an undoped region and a doped region, in optical connection with at least one of said input/output optical waveguides, to program each of said plurality of unit cells by electrically energizing said undoped and doped regions of said semiconductor material;

(iv) programming a first unit cell of said plurality of unit cells to accomplish a first function;

(v) performing optical signal processing; and then (vi) reprogramming said first unit cell to accomplish a second function that is different than said first function;

wherein either of said first function or second function comprises an optical coupler.

* * * * *